United States Patent [19]

Shier

[11] Patent Number: 4,964,117
[45] Date of Patent: Oct. 16, 1990

[54] TIMING SYNCHRONIZING CIRCUIT FOR BASEBAND DATA SIGNALS

[75] Inventor: John S. Shier, Apple Valley, Minn.

[73] Assignee: VTC Incorporated, Bloomington, Minn.

[21] Appl. No.: 253,059

[22] Filed: Oct. 4, 1988

[51] Int. Cl.$^5$ .................................................. H04L 7/033
[52] U.S. Cl. .................................... 375/108; 328/120; 375/120
[58] Field of Search ................. 375/108, 120; 328/120; 331/14, 18, 49, 60

[56] References Cited

U.S. PATENT DOCUMENTS

| | | | |
|---|---|---|---|
| 4,180,783 | 12/1979 | Khalifa | 331/2 |
| 4,301,537 | 11/1981 | Roos | 375/108 |
| 4,365,210 | 12/1982 | Harrington et al. | 331/1 A |
| 4,494,021 | 1/1985 | Bell et al. | 307/591 |
| 4,528,512 | 7/1985 | Yoshida | 329/50 |
| 4,570,125 | 2/1986 | Gibson | 329/50 |
| 4,580,100 | 4/1986 | Suzuki et al. | 329/50 |
| 4,604,583 | 8/1986 | Aoyagi et al. | 329/122 |
| 4,604,756 | 8/1986 | Moustakas et al. | 375/113 |
| 4,607,296 | 8/1986 | Smidth | 360/51 |
| 4,652,834 | 3/1987 | McAdam | 329/50 |
| 4,680,780 | 7/1987 | Agoston et al. | 375/120 |
| 4,849,993 | 7/1989 | Johnson et al. | 375/108 |

Primary Examiner—Douglas W. Olms
Assistant Examiner—Marianne Huseman
Attorney, Agent, or Firm—Kinney & Lange

[57] ABSTRACT

A timing synchronizing circuit with a phase locked loop. A multiplexor is employed to cause the phase locked loop to alternate between a self-excited mode for maintaining the frequency of a recovered timing signal and a mode in which state transitions of a baseband data signal are compared with the phase locked loop feedback signal to adjust the frequency of the recovered timing signal.

12 Claims, 2 Drawing Sheets

TIMING SYNCHRONIZING CIRCUIT FOR BASEBAND DATA SIGNALS

BACKGROUND OF THE INVENTION

1. Field of the Invention.

The present invention relates to timing synchronizing circuits for recovery of a clock signal and data from baseband data signals.

2. Technical Background

Common techniques for intelligence and data transmission depend upon a common timing standard between transmitting and receiving stations. Phase locked loops are widely used in circuits for recovery of clock signals from digital data signals, allowing expeditious synchronization of a receiving station including such a phase locked loop with the station transmitting the data signal. This eliminates the complication of providing an independent, synchronized clock in the receiving station. A classic phase locked loop configuration utilizes a phase comparator, filter and voltage controlled oscillator (VCO) coupled in a feedback loop configuration in such a way that the VCO generates an output signal of an appropriate frequency to decode the incoming data stream.

In a common form of baseband signaling, each unit of information corresponds to one cycle, or one clock pulse of the signal. Each unit of information is termed a bit and, as the signal, assumes one of a plurality of distinct voltage levels. Commonly, two signal voltage levels are used, arbitrarily designated "one" and "zero." The baseband signal assumes one of the two voltage levels during each clock pulse. The time duration of each clock pulse must be known to resolve or detect each bit of information received in a baseband signal. For example, where consecutive "ones" are received, no voltage level transition in the baseband signal occurs from one clock pulse to the next clock pulse. Without knowledge of the duration of the cycle, i.e. the bit length, it is impossible to determine how many "ones" (or "zeros") occurred during a period in which the baseband signal assumed a constant voltage level. Such a transmission system is also known as pulse code modulation.

Phase locked loops lock on the frequency of a signal with the strongest Fourier component, within the frequency band which is not rejected by filtering in the receiving unit. Where baseband is used to modulate a carrier, the phase locked loop can lock on to an independent clock signal transmitted with the modulated signal. In baseband signaling, however, the clock is determinable from voltage or logic level transitions of the baseband signal. In other words, some alternation in "ones" and "zeros" is necessary to resolve the clock. Attempts to apply prior art phase locked loops to baseband signaling formats have functioned properly only when there was a high probability of transitions between digital states of the signal.

Accordingly, it is desirable to provide a device which generates an accurate clock signal notwithstanding a relatively low probability in logic level transitions of a baseband data signal.

SUMMARY OF THE INVENTION

A timing synchronizing circuit for providing a clock signal on a clock output terminal and data on a data output terminal, the clock and data being recovered from a baseband digital data signal provided on a data input terminal, is disclosed. The timing synchronizing circuit provides an accurate recovered clock signal notwithstanding prolonged transmission of a single logic level, representing repetitious transmissions of data bits of the same value, in the baseband digital data signal.

The timing synchronizing circuit includes an input terminal for receiving a baseband digital signal. A logic level transition detector is connected to the input terminal for detecting transitions of the baseband signals between the two possible logic states. The logic level transition detector is clocked by a clock signal recovered by a phase locked loop.

The phase locked loop includes a phase detector for comparing two signals. One of the signals is provided by the feedback loop of the phase locked loop and is related to the recovered clock. The second signal is a multiplexed signal interleaving a signal related to the incoming data signal and the signal provided by the feedback loop. Multiplexing is keyed in response to the occurrence of transitions in the incoming baseband data signal. In the absence of a logic level transition in the incoming baseband data signal, the phase detector compares the feedback signal to itself. At such times the phase locked loop is self-excited. When a logic level transition occurs, the timing of the transition is compared with the feedback signal to correct the timing of the recovered clock and the feedback signal.

The phase locked loop further includes a voltage controlled oscillator connected to respond to the output of the phase detector for recovering the clock signal. The recovered clock signal is provided on an output terminal and is also used to clock the transition detector as described above.

The timing synchronizing circuit locks rapidly on the clock frequency if variation between the true clock frequency and the recovered clock frequency differ. However, the circuit also remains substantially locked to the clock frequency without significant drift for repetitions of same valued data bits exceeding twenty, notwithstanding the consequential absence of logic state transitions in the baseband signal.

DETAILED DESCRIPTION OF THE PREFERRED EMBODIMENT

Figure 1:
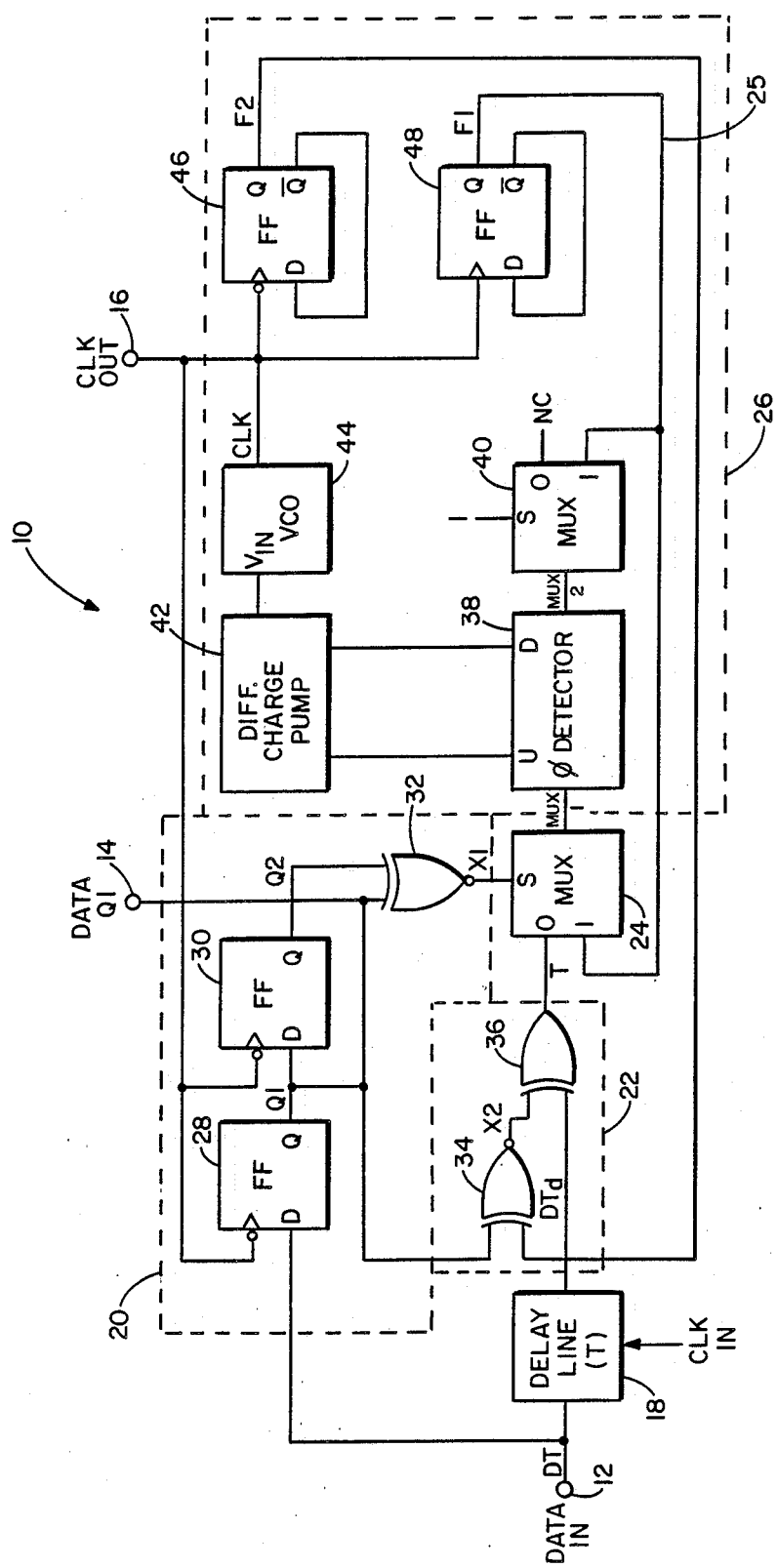
FIG. 1 is a block diagram of the timing synchronizing circuit of the present invention.

FIG. 1 illustrates a block diagram of timing synchronizing circuit 10. Circuit 10 includes a data input terminal 12 for receiving a baseband digital data signal DT. Timing synchronizing circuit 10 generates a data output signal Q1 on data output terminal 14 and a recovered clock signal CLK on clock output terminal 16.

Data input terminal 12 is connected to a digital delay line 18 and a transition detector 20. Digital delay line 18 can be clocked by CLK generated within timing synchronizing circuit 10, and corresponds to one clock pulse of the recovered clock. Digital delay line 18 is connected to a transition inverter circuit 22. Transition inverter circuit 22 provides an output T to the "0" input of multiplexor 24. Transition detector 20 is connected to clock output terminal 16 and provides a control signal on the S input of multiplexor 24 for determining whether the multiplexor transmits the signal received on its "0" input or its "1" input during a given time period. The "1" input is connected to feedback loop 25 of phase locked loop 26.

Phase locked loop 26 is connected to multiplexor 24, and thus is excited by either phase transitions T of the incoming data signal, or is self-excited. Phase locked loop 26 provides, in addition to a clock signal on output terminal 16, an inverter timing signal F2 to transition inverter 22 for controlling the timing of signals through the inverter and a feedback signal F1 to the "1" input of multiplexor 24.

The component sections of timing synchronizing circuit 10 are now discussed in detail. Data signals DT applied to data input terminal 12 are baseband digital signals characterized by distinct voltage levels indicating one of two logic states, typically 1 or 0. The data signal is applied to the data input of a negative edge triggered D type flip flop 28. The recovered clock is applied to the clock input of flip flop 28. The output signal Q1 is generated at the Q output of flip flop 28 is the data signal delayed by between one-half of a clock pulse and one clock pulse. The output Q1 of flip flop 28 is connected to the data input of negative edge triggered D type flip flop 30. Flip flop 30 is clocked by the recovered clock signal taken from clock output terminal 16. The output signal Q2 of flip flop 30 is thus the baseband data signal delayed by between one and one-half clock pulses to two clock pulses.

The output Q1 of flip flop 28 is applied to data output terminal 14. The outputs Q1 and Q2, respectively, of flip flops 28 and 30 are applied to separate inputs of negating exclusive OR gate 32. The output X1 of OR gate 32 is applied to the "S" input of multiplexor 24. Gate 32 generates an "0" output in response to complementary outputs from flip flops 28 and 30, i.e., in conjunction with state transitions of the data signal. State transitions in the data signal result in multiplexor 24 transmitting the signal received on its "0" input to phase locked loop 26. In the absence of state transitions of the data signal, gate 32 generates a "1" output causing multiplexor 24 to connect the signal input F1 on its "1" terminal to phase locked loop 26.

Timing synchronizing circuit 10 determines the occurrence of state transitions in the data signal before the transitions are coupled to phase locked loop 26. Simultaneously with application of the data signal DT to flip flop 28, the data signal is applied to delay line 18, which with transition inverter 22, delays application of data transitions T to multiplexor 24 until after transition detector 20 has generated a signal indicating presence of the state transition.

Transition inverter 22 includes a negating exclusive OR gate 34 connected to receive a timing signal from phase locked loop 26 and the output signal of flip flop 28. The output of gate 34 is compared to the delayed data signal from delay line 18 by an exclusive OR gate 36 and the result applied to the "0" input of multiplexor 24. The relationship of the timing signal to the feedback signal of phase locked loop 26 is such that the output of gate 36 and the feedback signal have same polarity voltage level transitions during given clock periods, or if voltage level transitions in the data signal is sufficiently out of bounds, the transition is ignored.

Phase locked loop 26, as indicated above, provides the recovered clock signal, feedback signal and inverter timing signal utilized in state transition detection. Phase locked loop 26 includes a phase detector 38 which is connected to compare the phase relationship of the outputs of multiplexor 24 and multiplexor 40. Phase detector 38 generates pulses on its Up and Down outputs indicating whether the output from multiplexor 40 is lagging or leading the output of multiplexor 24. The U and D outputs are connected to a differential charge pump 42 which provides an increased voltage output to VCO 44 when phase lag from multiplexor 40 occurs. Charge pump 42 provides a reduced voltage output to VCO 44 when the output of multiplexor 40 leads the output of multiplexor 24.

VCO 44 provides a CLK on clock output terminal 16 which varies in frequency as a function of the voltage level of the output of charge pump 42. The output of VCO 44, i.e., the recovered clock signal, is applied to the clock inputs of negative edge triggered D type flip flop 46 and positive edge triggered D type flip flop 48. The inverse outputs of flip flops 46 and 48 are fed back to the data inputs of the flip flops so that the flip flops operate as divide by two timing signal generators. The output of flip flop 48 changes on the positive edges of the recovered clock signal and provides the feedback signal of phase locked loop 26. The output of flip flop 46 changes state with each negative edge transition of the clock signal and provided the timing signal for transition detector 22.

The feedback signal from flip flop 48 is provided the "1" inputs of both multiplexors 24 and 40. Multiplexor 40 is connected to appropriate signal inputs such that the feedback signal F1 is transmitted to phase detector 38 after a delay equal to the delay of multiplexor 24. The function of multiplexor 40 is to provide just such a delay and any other appropriate delay circuit may be used in lieu thereof.

Phase detector 38 compares the outputs MUX 2 and MUX 1 of multiplexors 40 and 24, respectively, and accordingly is connected to receive the outputs of the multiplexors on separate input terminals. When multiplexor 24 transmits the phase locked loop feedback signal to phase detector 38, the phase detector compares the feedback signal to itself. In other words, phase locked loop 26 operates in self-excited mode. When state transitions occur in the data input signal, phase detector 38 compares the relative phase of transitions in the data signal with transitions in the feedback signal for adjustment of the feedback signal. While drift in the clock output of phase locked loop 26 is expected in the self-excited mode, computer simulations of the circuit have indicated the clock output remains within adequate bounds notwithstanding an absence of state transitions in the data signal exceeding 20 clock pulses. Once a recovered clock signal has been established, simulated messages have been successfully received and read without providing a clock generating preamble to the data packet.

Figure 2:
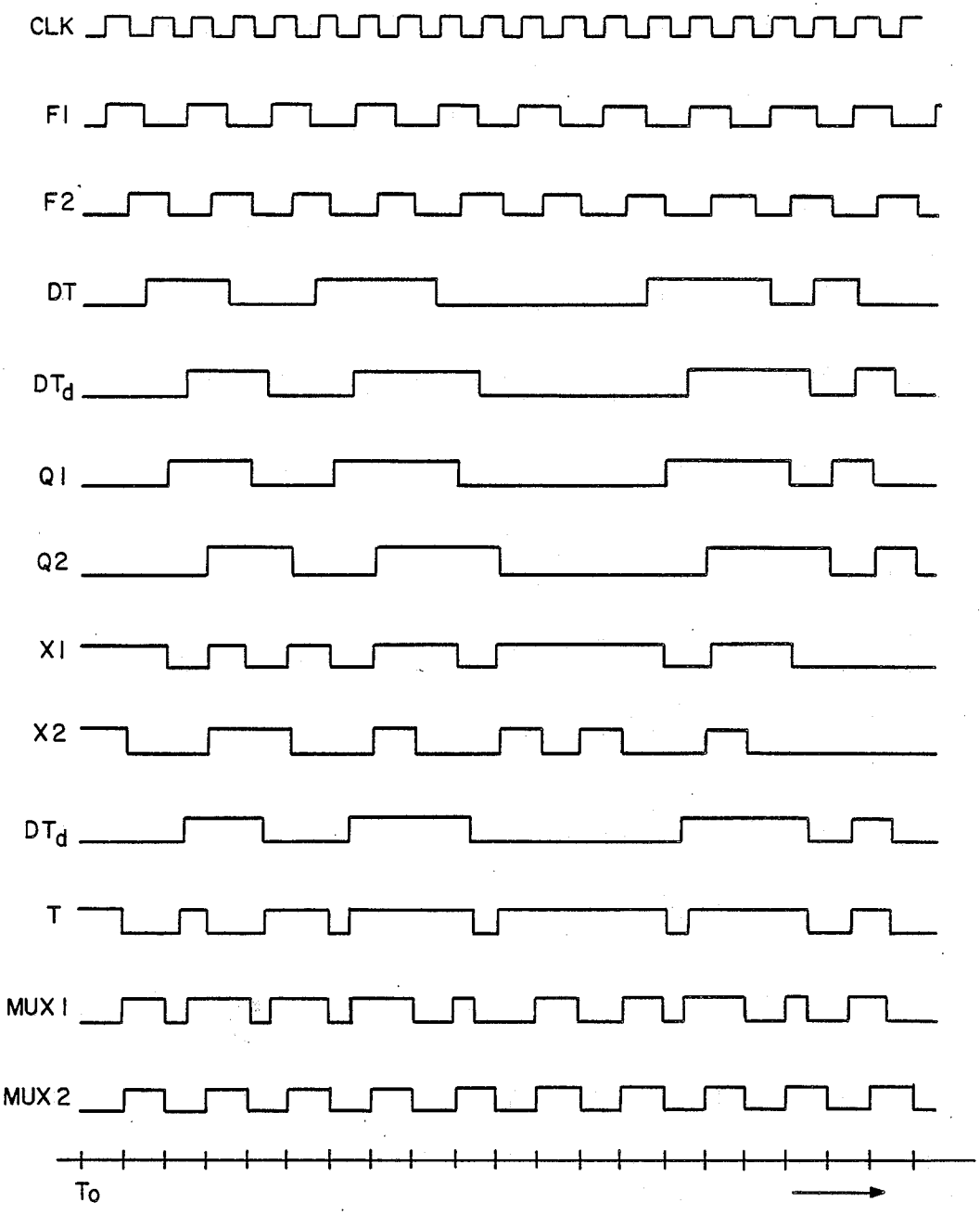
FIG. 2 is a timing diagram illustrating operation of the present invention.

Operation of the circuit is illustrated in the idealized timing diagram of FIG. 2. A data signal DT is characterized by two logic states, herein arbitrarily selected to be 1 and 0, represented by a distinct voltage level difference in the signal. A recovered clock signal CLK has been generated by the circuit in response to the occurrence of past transitions in the data signal and is shown in existence at time. Feedback signal F1 and inverter timing signal F2 have a frequency equal one-half that of CLK with F2 lagging F1 by half of a pulse of CLK.

Signals Q1 and Q2 are the delayed data signal DT. The delay of Q1, which corresponds to the output of flip flop 28 is dependent upon the relative timing in transitions of DT versus transitions in CLK, but does not exceed one clock pulse of CLK. The delay of Q2 is equal to the delay of Q1 plus one clock pulse of CLK. Q1 and Q2 are compared in a negating exclusive OR operation to generate control signal X1.

Transition inverter signal T is a positive going transition corresponding with each logic state transition of DT, delayed by an appropriate period indicated by signal DTd. Transitions which arrive early or late by a period greater than one-half of a clock pulse of CLK are ignored. MUX 1 is an interleaved signal formed from portions of T and F1 over time. Generation of MUX 1 is controlled by the state of X1, with the portions corresponding to T being indicated by arrows. MUX 2 is a delayed map of F1.

Although the present invention has been described with reference to preferred embodiments, workers skilled in the art will recognize that changes may be made in form and detail without departing from the spirit and scope of the invention.

What is claimed is:

1. A timing synchronizing circuit for recovering a clock from a data signal characterized by state transitions, the circuit comprising:
   a phase detector with first and second input terminals;
   a voltage controlled oscillator for generating a recovered clock signal;
   filter means for coupling the output of the phase detector to the voltage controlled oscillator;
   means for generating a feedback signal related to the recovered clock signal;
   means for coupling the feedback signal to the first input terminal of the phase detector;
   a data input terminal;
   state transition detection means coupled to the data input terminal and responsive to the recovered clock signal for generating a signal indicating the occurrence of state transitions of the data signal;
   means coupled to the data input terminal for generating a transition timing signal; and
   multiplexing means responsive to the state transition detection means for coupling the feedback signal to the second input terminal of the phase detector in the absence of state transitions of the data signal and for coupling the signal indicating occurrence of state transitions to the second input terminal of the phase detector when state transitions in the data signal have been detected.

2. The timing synchronizing circuit of claim 1 wherein the state transition detection means further includes:
   a first flip flop coupled to receive the data signal and clocked by the recovered clock signal;
   a second flip flop coupled to receive the output of the first flip flop and clocked by the recovered clock signal; and
   exclusive OR means for comparing the outputs of the first and second flip flops for generating a control signal for the multiplexing means.

3. The timing synchronizing circuit of claim 2 wherein the feedback signal generating means includes an edge triggered frequency dividing circuit producing a first signal with a frequency which is a harmonic of the frequency of the recovered clock.

4. The timing synchronizing circuit of claim 3 and further comprising inversion timing signal generating means including an edge triggered frequency dividing circuit for producing an inversion timing signal with a frequency which is a harmonic of the frequency of the recovered clock.

5. The timing synchronizing circuit of claim 4 wherein the edge triggered frequency dividing circuit of the feedback signal generating means and the edge triggered frequency dividing circuit of the inversion timing signal generating means are triggered on opposite edges of pulses of the recovered clock for providing signals of one-half the frequency of the recovered clock and having a fixed phase relationship.

6. The timing synchronizing circuit of claim 5 wherein the means for generating the transition timing signal includes a delay line connected in series with the data input terminal, a negating exclusive-OR circuit coupled to receive the output of the first flip flop and the timing signal, and an exclusive-OR circuit coupled to the output of the negating exclusive-OR circuit and to an output of the delay line for receiving the delayed data signal, with the output of the exclusive-OR circuit being connected to the multiplexing means.

7. The timing synchronizing circuit of claim 6 wherein the output of the first flip flop circuit is detected data.

8. A timing synchronizing circuit comprising:
   means for comparing the phases of two signals and generating a phase difference signal;
   reference signal generating means responsive to the phase difference signal for generating a reference signal;
   means for coupling the reference signal to the phase comparing means;
   means for detecting state transitions in a data signal and generating a control signal indicating the presence and absence of such transitions;
   means for generating a signal indicating timing of logic state transitions of the data signal; and
   multiplexing means responsive to the control signal for coupling the reference signal to the phase comparator means in the absence of state transitions of the data signal such that the phase comparator means compares the reference signal with itself, and for coupling the signal indicating timing of the logic state transitions in the data signal to the phase detector when a state transition in the data signal has occurred such that the phase comparator means compares the reference signal with the signal indicating the timing of logic state transitions.

9. The timing synchronizing circuit of claim 8 wherein the state transition detection means further includes:
   a first flip flop receiving a first signal related to the reference signal on a clock input terminal and the data signal on a data input terminal;
   a second flip flop receiving the first signal on a clock input terminal and the output of the first flip flop on a data input terminal; and
   control signal generating means responsive to the outputs of the first flip flop and the second flip flop for generating the control signal.

10. A timing synchronizing circuit comprising:
    a data input terminal for receiving a data signal;
    a clocked state transition detector connected to the data input terminal;
    a phase detector with first and second input terminals;
    a voltage controlled oscillator coupled to the phase detector for generating a recovered clock signal;
    means for coupling the recovered clock signal to the clocked state transition detector;

means for generating a feedback signal related to the recovered clock signal and for applying the feedback signal to the first input terminal of the phase detector;

means for generating a data signal state transition timing signal; and a multiplexer connected to the second input terminal of the phase detector and responsive to the transition detector for coupling the feedback signal to the second input terminal of the phase detector in the absence of state transitions of the data signal and for coupling state transitions of the data signal to the second terminal of the phase detector when state transitions in the data signal are present.

11. A method of operating a phase lock loop used for recovery of a clock signal from a baseband data signal wherein the baseband data signal is subject to periods of relatively infrequent logic state transitions, and the phase lock loop includes a phase detector for comparing phase difference between two input signals, the method comprising the steps of:

(a) establishing a recovered clock signal upon initial detection of logic state transitions, in a data signal;

(b) self-exciting the phase lock loop in the absence of logic state transitions of the data signal by providing the recovered clock signal as both input signals to the phase detector;

(c) detecting a logic state transition in the baseband data signal;

(d) comparing the phase of the logic state transition with the phase of the recovered clock signal;

(e) adjusting the frequency of the recovered clock signal to eliminate the phase difference between the recovered clock signal and the data signal transitions; and (f) returning to step (b).

12. A timing synchronizing circuit comprising:

a phase locked loop for generating a feedback signal;

means for detecting state transitions in a data signal and generating a control signal indicating the presence and absence of the data transitions;

means responsive to the data signal for generating a transition signal;

multiplexing means responsive to the control signal for switching between the feedback signal and the transition signal as a function of the presence and absence of the data transitions in the data signal; and means for coupling the output of the multiplexing means to the phase locked loop.

* * * * *